United States Patent [19]

Steele

[11] Patent Number: 5,295,659
[45] Date of Patent: Mar. 22, 1994

[54] SHAFT SEAL FOR BUTTERFLY VALVE

[75] Inventor: James R. Steele, Stillwater, Minn.

[73] Assignee: Dynamic Air, Inc., St. Paul, Minn.

[21] Appl. No.: 96,457

[22] Filed: Jul. 26, 1993

[51] Int. Cl.⁵ .............................................. F16K 1/22
[52] U.S. Cl. ..................................... 251/173; 251/306
[58] Field of Search ................................ 251/173, 306

[56] References Cited

U.S. PATENT DOCUMENTS

| | | | |
|---|---|---|---|
| 3,173,650 | 3/1965 | Lotterman et al. | 251/306 |
| 3,306,316 | 2/1967 | Stillwagon | 251/306 |
| 4,014,511 | 3/1977 | Uno | 137/454.2 X |
| 4,176,675 | 12/1979 | Liberman | 251/173 X |
| 4,396,199 | 8/1983 | Boyd | 277/167.5 |
| 4,703,937 | 11/1987 | Chrzanowski | 277/29 |
| 4,706,970 | 11/1987 | Ramirez | 277/205 |
| 4,836,499 | 6/1989 | Steele | 251/173 |
| 4,886,241 | 12/1989 | Davis | 251/214 |
| 5,056,758 | 10/1991 | Bramblet | 251/214 |
| 5,071,318 | 12/1991 | Bice | 415/230 |
| 5,178,180 | 1/1993 | Parris | 137/242 |

*Primary Examiner*—John C. Fox
*Attorney, Agent, or Firm*—Jacobson & Johnson

[57] ABSTRACT

The present invention comprises an improved two-way dynamic shaft-sealing member for a fluid transport system having a butterfly valve with an inflatable seal with the improved shaft-sealing member including a rigid race secured to and carried by the interface portion of the inflatable seal to maintain the integrity of the interface portion of the seal with a compressible sealing ring located in the race and held in confinement by the race to hold the sealing ring in a sealing condition against the inside of the race and the outside of the shaft to prevent fluids from escaping therepast as the shaft is moved or the inflatable seal is inflated or deflated.

8 Claims, 4 Drawing Sheets

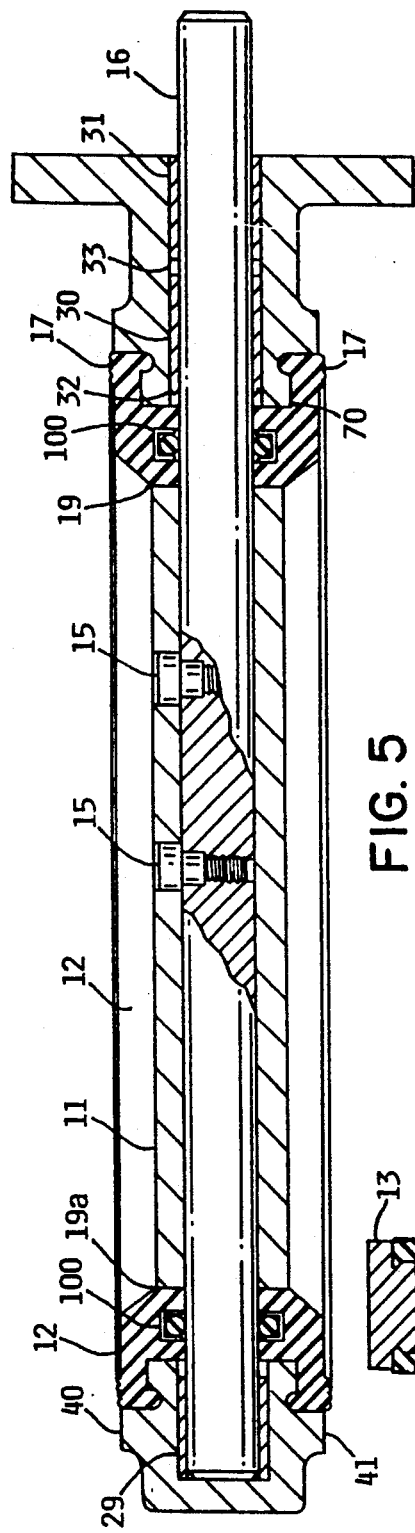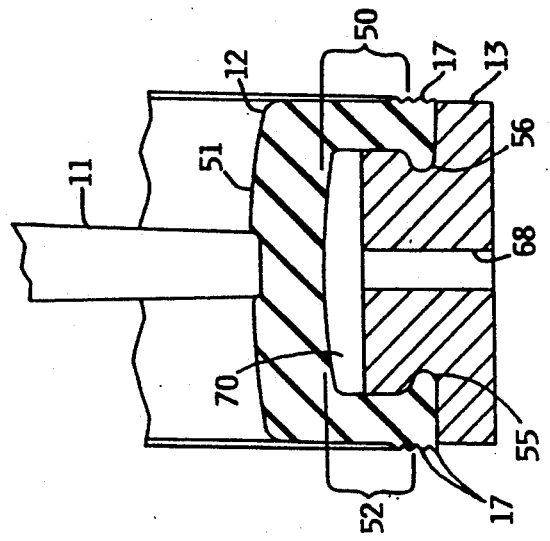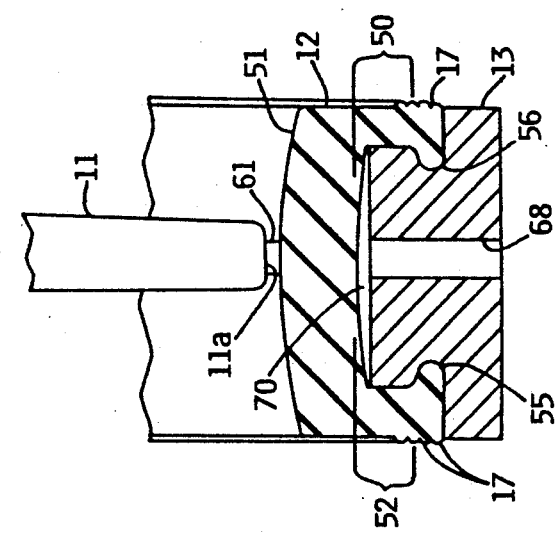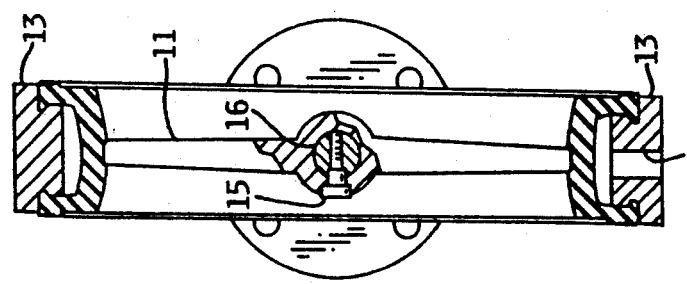

SHAFT SEAL FOR BUTTERFLY VALVE

FIELD OF THE INVENTION

This invention relates generally to static and dynamic shaft seals located in inflatable seals for butterfly valves and, more specifically, to improvements to a two-way static and dynamic shaft seal carried by the portion of the inflatable seal that forms an interface between the transported fluids and the fluids used to pressurize the inflatable seal.

BACKGROUND OF THE INVENTION

U.S. Pat. No. 4,836,499 shows a butterfly valve with a shaft sealing member located in the inflatable seal and, more specifically, around the portion of shaft of the butterfly valve extending through the resilient portion of the inflatable seal that forms an interface between the transport line and the inflation chamber of the inflatable seal. Tyically, butterfly valves are used to open or close lines that transport fluids that may contain liquids and or solids. One of the features of most butterfly valves is that the shaft, which extends through the inflatable seal, must be statically and dynamically sealed against the side walls of an opening extending through the resilient portion of the inflatable seal to prevent fluids from escaping therepast. This sealing is more critical if the transport system is to handle liquids and the like that remain under pressure whether the butterfly valve is open or closed. One of the difficulties in making an effective static and dynamic chamber seal is that the physical integrity of the sealing member around the shaft should be maintained or the effectiveness of the inflatable seal may be compromised. Unless the static and dynamic shaft seal is effective one cannot prevent the fluids being transported from contaminating the fluids used to inflate the seal as well as prevent the fluids used to inflate the seals from contaminating the transported fluids. This problem is particularly acute if the fluid transport lines remains pressurized when the butterfly valve inflatable seal is deflated since without an effective shaft seal the pressurized transport fluids leaks out along the shaft and into the inflation chamber of the inflatable seal.

Thus one of the problems in sealing the transport lines from the inflation chamber of the inflatable valves is that the shaft-sealing member is located around the shaft of a butterfly valve that extends through a resilient member that forms part of an inflatable seal which expands and contracts in response to pressurization of the inflatable seal. The two-way static and dynamic shaft-sealing member must be such that the liquid pressures from the transport line cannot force fluid out of the transport line and into the inflation chamber of the inflatable seal nor can the pressures used to inflate the inflatable seal force fluids from the inflation chamber into the transport line. In addition the two-way sealing relationship of the shaft-sealing member to the shaft must be maintained under both static conditions and dynamic conditions that occurs as the shaft rotates from one location to another within the opening extending through the inflatable seal. In addition the shaft-sealing member must also maintain its sealing relationship to the shaft as the shaft-sealing member slides axially along the shaft in response to pressure changes occurring during opening and closing of the butterfly valve. U.S. Pat. No. 4,836,499 patent shows a shaft sealing member located in the massive portion of the inflatable seal comprising a series of circular ridges and grooves. If fluid transport pressure is high the series of ridges and grooves do not prevent liquids from passing through the ridges and grooves when the inflatable seal is in a deflated condition. U.S. Pat. No. 4,836,499 also shows a liquid sealing member for sealing the portion of the inflatable seal behind the inflation chamber with the seal comprising two annular seals that have legs with the legs of the seals located parallel to the axis of the shaft and facing in opposite directions with the annular seals radially held in position by an annular band located in the inflatable seal.

Generally, inflatable seals for valves and more particularly inflatable seals for butterfly valves are well known in the art. To be effective in sealing the transport lines the inflatable seals should be durable for use in abrasive environment and should not contain recesses that become contaminated with the particles being transferred thus requiring periodic flushing of the valve.

The contamination problem is particularly troublesome if food materials are being transported since the accumulated food particles can contaminate the food and produce health risks. A butterfly valve inflatable seal should provide an effective seal around the periphery of the butterfly disk and still provide a valve that can be easily opened or closed. While inflatable seals have eliminated shaft sealing problems by having the axis of rotation of the valve offset from the valve seal, it has been found that such offset valves are prone to accumulation of material along the edges of the valve which may produce contamination in the system. Furthermore, valves with the axis of rotation offset from the seal provide for difficulty in opening or closing since the forces of the material acting on the valve surface create force imbalances making it difficult to oftentimes open and close the valve. In addition, such offset valves do not provide for equal flow since they provide a high profile that oftentimes interferes with the flow of material through the valve. Furthermore, such valves are often bulky and not suitable for use in high pressure large diameter material transportation systems. The present invention provides an improved two-way static and dynamic shaft seal that retains the physical integrity of the inflatable seal while being carried by the resilient portion of the inflatable seal that forms an interface between the transported fluids and the fluids used to pressurize the inflatable seal.

DESCRIPTION OF THE PRIOR ART

U.S. Pat. No. 5,178,180 shows a packing seal for a valve having a generally U-shape with feet extending from each of the legs of the valve seal.

U.S. Pat. No. 3,955,859 shows a bearing with an annular seal containing annular lips which are in wiping contact with a shaft. In one embodiment, the annular legs are free; in another embodiment, the annular legs are restrained within a metal ring.

U.S. Pat. No. 4,886,241 shows a fluid valve with packing members located around the shaft.

U.S. Pat. No. 5,056,758 shows a series of sealing members located around a shaft.

U.S. Pat. No. 5,071,318 shows seal parts arranged so that the O-ring is located in rolling engagement between the shaft and a support housing.

U.S. Pat. No. 4,396,199 shows a butterfly valve with a peripheral seal for the disk held in between a pair of J-shaped members which are located in the housing of the butterfly valve.

U.S. Pat. No. 4,703,937 shows a pair of O-rings located around a shaft which includes a member to prevent the O-ring from being compressed into the vent hole during axial shaft movement.

U.S. Pat. No. 4,706,970 comprising a flexible ring with laterally extending members which are sandwiched together to form a sealing device.

U.S. Pat. No. 4,836,499 shows a butterfly valve with an inflatable seal and a series of concentric ridges and recesses to seal around the shaft, which extends through the inflatable seal.

BRIEF SUMMARY OF INVENTION

An improved two-way dynamic shaft-sealing member for sealing around a shaft of a butterfly valve having an inflatable seal. The improved shaft-sealing member comprises a rigid race molded to and carried by a resilient portion of the inflatable seal, which forms the interface between the transport line and the inflatable seal inflation chamber, and a resilient sealing ring.

The rigid race holds the sealing ring in a sealing condition against the inside of the race and the outside of the shaft to prevent fluids from escaping therepast as the shaft is rotated or the inflatable seal is inflated or deflated. The molding of the race to the sealing member maintains the integrity of the resilient portion of the inflatable seal proximate the shaft and also prevents fluids from escaping around the race.

BRIEF DESCRIPTION OF THE DRAWINGS

FIG. 4 is a side sectional view showing the butterfly valve of FIG. 1 in closed, locked and sealed condition;

FIG. 5 is another side sectional view showing the butterfly valve of FIG. 1 and the housing;

FIG. 6 is an enlarged sectional view of the inflatable sealing member in a retracted position;

FIG. 7 is an enlarged sectional view of the inflatable sealing member of FIG. 6 in a locked position;

DESCRIPTION OF THE PREFERRED EMBODIMENT

Figure 1:
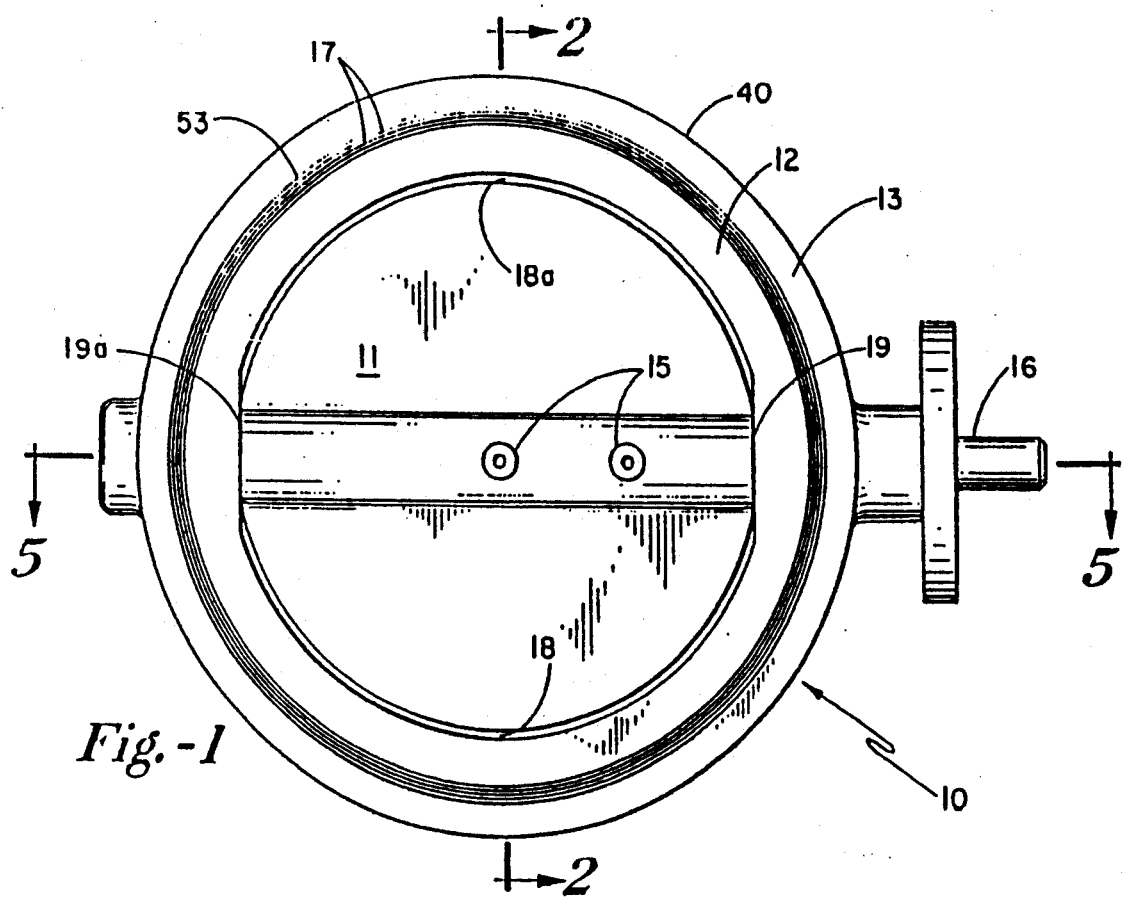
FIG. 1 is a front view of a butterfly valve in the closed position.

Referring to FIG. 1, reference numeral 10, generally identifies a butterfly valve for use with the improved two-way dynamic shaft-sealing member of the present invention. The butterfly valve comprises a one-piece circular housing 13 for mating with a conduit. Located in a 360 degree rotatable relationship within an annular U-shaped inflatable sealing member 12 is a rotatable butterfly disk 11. Butterfly disk 11 which is made of a rigid material is fastened to a shaft 16 through bolts 15. Shaft 16 extends completely through the annular inflatable sealing member 12 and is rotatably supported in housing 13. A handle (not shown) is attached to shaft 16 to permit an operator to rotate butterfly disk 11 into the open or closed position. FIG. 1 shows butterfly disk 11 in the closed but unsealed position. The butterfly disk 11 and the sealing member 12 are shown with a clearance gap located therebetween. More specifically, on the periphery of butterfly disk 11 there is a gap 18 and 18a and on one end butterfly valve 11 while no gap is shown in regions 19 and 19a seal 12 also radially expands and contracts in this region in response to pressurization of the inflatable seal 12. The purpose of maintaining side gaps between sealing member 12 in the uninflated condition and the disk member is to provide relative ease in opening and closing of the butterfly disk 11. That is, there is no interference or mechanical friction to be overcome by the interference of the edge of the butterfly disk 11 with the edge of the sealing member 12 in the deflated condition. A further advantage is that there is no wear between sealing member 12 and the butterfly disk 11 thereby virtually eliminating the contamination problem produced by particles being abraded from the sealing member during opening and closing disk 11.

Figure 2:
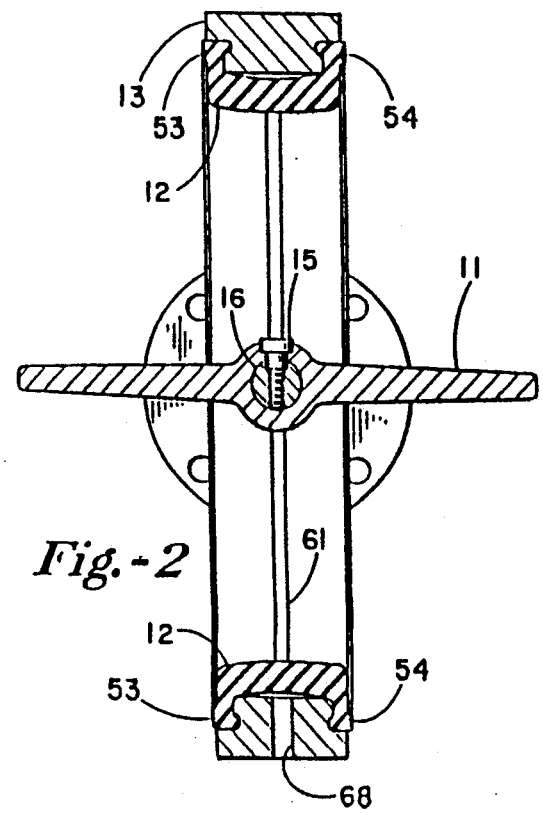
FIG. 2 is side sectional view showing the butterfly valve of FIG. 1 in the open position.
Figure 3:
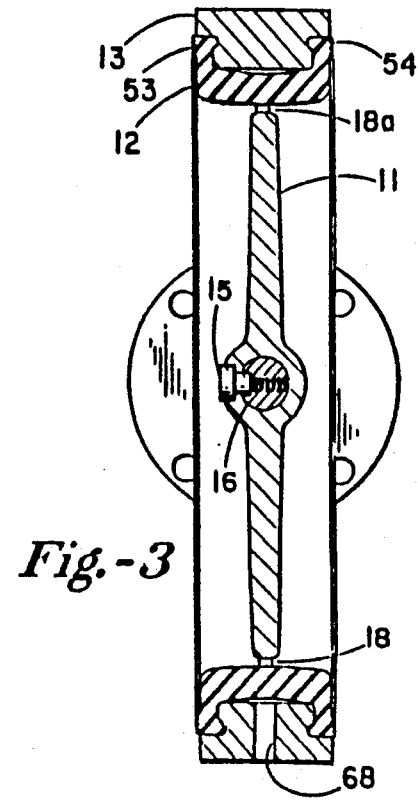
FIG. 3 is a side sectional view showing the butterfly valve of FIG. 1 in the closed but unlocked and unsealed condition.

To illustrate the operation of the butterfly valve of FIG. 1 and the various modes, reference should be made to FIGS. 2–6. FIG. 2 is a cross-sectional view that shows the butterfly disk 11 in the fully open position. FIG. 3 is a similar cross-sectional view showing the butterfly valve in the closed but unsealed position. FIG. 5 is a cross-sectional view showing the component parts and the location of the rotatable shaft 16 which extends through shaft sealing members 100 located in annular inflatable sealing member 12. Located on one end of shaft 16 is a seal 33 and a set of bearings 30 and 31 and similarly located on the other end is a bearing 29 to provide for rotation of shaft 16. Since shaft 16 extends through openings in the annular inflatable seal member, it is necessary to also provide a fluid tight seal around the ends of shaft 16 which extend through inflatable seal 12. The two-way dynamic seal around the end portions of shaft 16 located in inflatable sealing member 12 is provided by shaft-sealing members 100.

Figure 8:
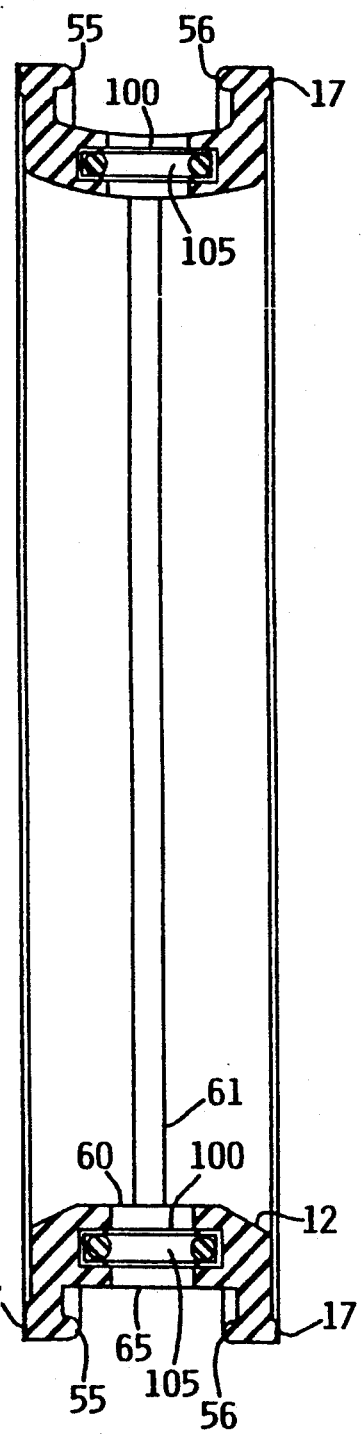
FIG. 8 is a sectional view of the inflatable sealing member of FIG. 6.
Figure 11:
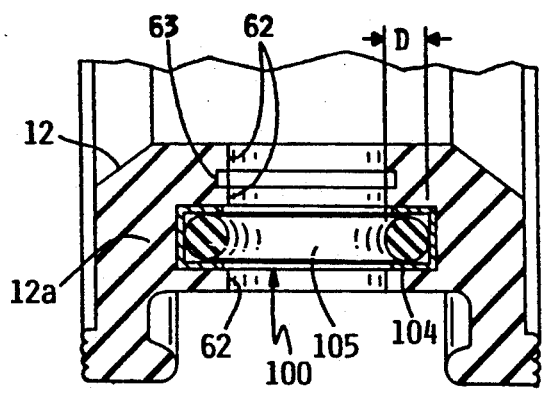
FIG. 11 shows a partial sectional view of the shaft-sealing member of the present invention.

The two-way dynamic shaft-sealing member 100 which is further depicted in FIG. 8 and FIG. 11 prevents air from escaping from the inflation chamber 70 (FIG. 7) and into the interior of the butterfly valve along shaft 16 as well as prevent fluids from the transport line from entering inflation chamber 70 along shaft 16.

Figure 9:
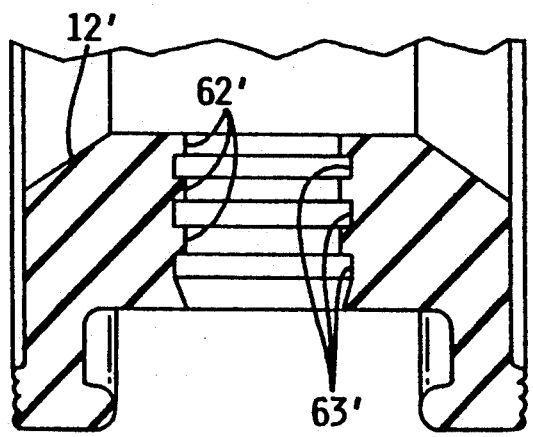
FIG. 9 is a sectional view of a prior art shaft sealing member.
Figure 10:
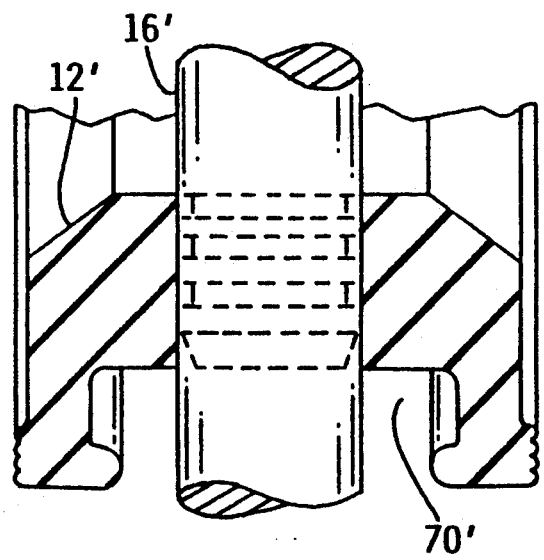
FIG. 10 shows a sectional view of a prior art shaft sealing member of FIG. 9 with a shaft located therein.

FIG. 9 is an enlarged view of prior art interface shaft-sealing member comprising protruding ridges 62 and recess 63 to produce a set of concentric annular ridges for engaging shaft 16. FIG. 10 illustrates the prior art ridges and recess in phantom position and their relationship to shaft 16 to form a concentric compressive contact with shaft 16 to provide a seal along shaft 16. It will be apparent that compression of ridges 62 around shaft 16 will be effected by the resiliency of seal 12' as well as by the pressure in the inflation chamber located below seal 12'.

FIG. 8 and FIG. 11 show the shaft sealing region of the present invention comprises a shaftsealing member 100, an annular groove 63 and annular sealing ridges 62 which extend out to frictionally engagement with shaft 16. The inflatable sealing member as shown in FIG. 8 also contains a flat sealing region 61 section that extends around the periphery of annular sealing member 12 to engage the edge of the butterfly disk 11.

Referring to FIG. 11 located below ridges 62 is a shaft-sealing member comprising a circular rigid sealing race 104 having a general U-shaped cross section. Located within rigid race 104 is a flexible sealing ring 105 made from a suitable elastomer or the like. Typically, sealing ring 105 is made from a resilient material and is commonly sold under the name of "O ring."

Figure 12:
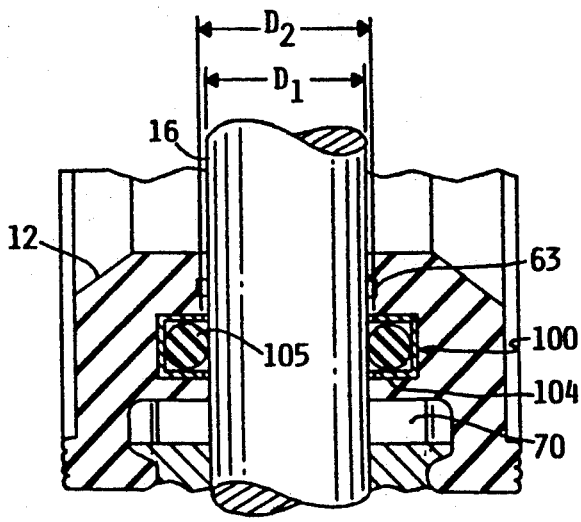
FIG. 12 shows a partial sectional view of the shaft-sealing member of FIG. 11 with a shaft engaging the shaft-sealing member.

FIG. 11 shows the sealing ring without the butterfly valve shaft therein, and FIGS. 12 shows the sealing member 105 located around shaft 16. To understand the operation of the shaft-sealing member, reference should be made to FIG. 13 which shows rigid race 104 located in the massive but resilient portion 12a of inflatable seal 12 which normally moves as a unit during opening and closing of the butterfly valve (see FIG. 6 and FIG. 7). Race 104 forms three sided support and has three members: a first side annular member 101, a central annular member 102 and a second side annular member 103 which form a race with a generally U-shaped cross section. Race 104 has exterior surfaces 101a, 102a and 103a which are molded directly to sealing member 12.

The molding of the exterior of race 104 to the interface portion of sealing member 12 has a two-fold purpose. First, it creates a fluid-tight seal between the resilient material of inflatable seal 12 and the exterior of race 104, and, second, it maintains the structural integrity of the portion of the massive sealing region around the shaft so the massive portion of the seal 12 can move in and out as a unit around shaft 16 during inflation and deflation of annular seal 12.

Figure 13:
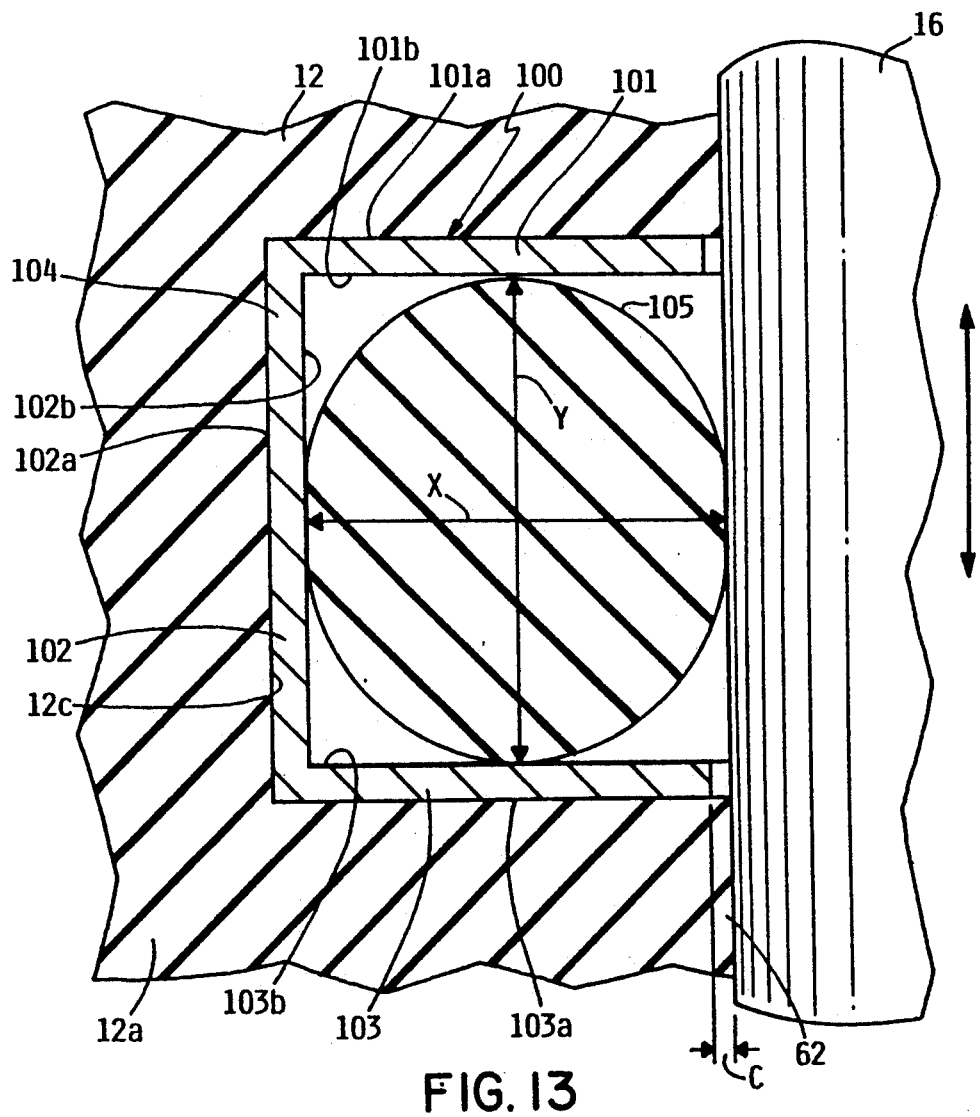
FIG. 13 shows a partial enlarged sectional view of the shaft-sealing member of FIG. 11 with the shaft-sealing member engaging the shaft and the inflatable sealing member.

As shown in FIG. 13, race 104 radially and laterally confine sealing ring 105 therein to provide a two-way static and dynamic seal. That is, sealing ring 105 is squeezed between surface 102b of race 104 and the outside surface of shaft 16. FIG. 13 illustrates that, in the radially confined region, the diameter of the sealing ring is denoted by "x" which is less than the relaxed dimension "D" of the sealing ring illustrated in FIG. 11.

In contrast, the sealing ring is expanded in the lateral region as indicated by the dimension "y" which is greater than the relaxed diameter "D". Thus, the race, which is preferably made of a metal such as brass, holds the sealing ring 105 in a fluid-tight seal between sealing member 105 and shaft 16, as well as between sealing member 105 and surface 102b. Since the sealing ring 105 is held in a compressive sealing relationship against annular shaft by the three sides of race 104, the seal becomes effective for sealing fluids and particularly liquids from passing in either direction along shaft 16 even though there may be relative movement between shaft 16 and the interface portion of the inflatable sealing member.

FIG. 12 shows that the race has an inner diameter $D_2$ and shaft 16 has an outer diameter $D_1$, with $D_2$ being slightly larger than $D_1$ to provide a clearance "c" as illustrated in FIG. 13. The clearance prevents the race from accidentally contacting, and thus possibly scoring, shaft 16 during expansion and contraction of seal 12 as well as during rotational movement of shaft 16. Thus, in the present invention the race is carried by the massive region of the inflatable seal, but it is carried in an integral relationship as well as a radially spaced position from shaft 16 so it does not accidently score the shaft during motion of the shaft. By having the sealing ring supported by the rigid race the effects of resiliency of the inflatable seal can be minimized because the race absorbs compressive pressures on the sealing ring without transferring them to the resilient sealing member that may flex and permit escape of fluid therepast.

A further feature of the present invention is that it compares a two stage seal since the shaft sealing member 100 is located interior of the ridges 62.

In order to illustrate the sealing operation of the butterfly valve, reference should be made to FIGS. 4-7. FIG. 5 and FIG. 1 which show inflatable annular sealing member 12 in the deflated condition with a clearance between butterfly disk 11 and the annular sealing member 12. FIG. 6 illustrates the seal 12 with the clearance between sealing edge 11a of valve 11 and sealing surface 61 in the closed position but unsealed position. A passage 68 permits air to be introduced into chamber 70 to inflate annular sealing member 12. FIG. 6 also clearly shows the dome-shaped top of annular sealing member 12. Sealing edge 11a mates with annular sealing surface 61 which extends around annular sealing member 12. Annular sealing member 12 comprises an elastomer or rubber member which has a U-shaped cross-section with a pair of annular legs 50 and 52 with annular lips 55 and 56 attached thereto to engage mating annular recesses in housing 13.

FIG. 6 shows annular sealing member 12 in the uninflated condition and identifies annular legs 50 and 52 on annular sealing member 12 in the uninflated condition or retracted condition. In the uninflated condition the natural resilience of the annular legs 50 and 52 hold sealing member 12 on housing 13 and thereby provide sufficient clearance to enable one to open and close the butterfly disk 11 with relative ease. In the sealed mode, which is shown in FIG. 4 and FIG. 7, air has been introduced into inflation chamber 70 which is located between housing 13 and sealing member 12 through external inlet 68. In the inflated condition air pressure, typically 10 psi, is sufficient to radially stretch legs 52 and 50. The lengthening of legs 50 and 52 causes the more massive dome-shaped interface portion 51 of annular sealing member 12 to deflect upward and deform locally around the edge of the butterfly disk to lock the edge of the butterfly disk 11 at the center portion of annular sealing member 12 thereby preventing accidental opening of butterfly disk 11. As can be seen in FIG. 4 and FIG. 7, the lengthening of the annular legs 50 and 52 and the local deformation of the more massive dome-shaped portion 51 around the edge 11a permits the edge of the disk to form a generally U-shaped locked engagement with annular sealing member 12 to both tightly seal and lock the edge of the butterfly disk 11 to annular sealing member 12 while the annular lips 55 and 56 securely hold a portion of the annular sealing member 12 in place and provide for automatic retraction of the annular sealing member 12 once the air pressure is released from chamber 70. FIG. 6 and FIG. 7 illustrate that the massive portion of the sealing member moves as a unit and as it does, it provides a self-cleaning action by always forcing materials into the valve as the valve is closed. That is, the more massive portion of the seal moves like a solid unit during pressurization of the inflatable seals, yet when the massive portion of the seal comes in contact with the valve it deforms locally to provide a locking seal around disk 11.

FIG. 6 shows annular elastomer sealing member 12 which has a domed section of predetermined thickness and annular legs 50 and 52 of thickness less than the domed section of seal 12. That is, the annular elastomer sealing member 12 is sufficiently thick in comparison to annular legs 50 and 52 so that under normal operating pressure the entire annular sealing member portion 51 deflects upward in response to air pressure as an integral member that moves toward edge 11a of butterfly valve 11. That is, the integral annular sealing member 12 has sufficient rigidity even though it is resilient so it does not deform as it expands but instead moves upward as a unit until edge 11a contacts sealing member 12. Increasing the pressure causes member 12 to form a slight local depression in member portion 51 and thereby provide an airtight seal around the edge 11a of butterfly valve 11, i.e., gaps 18 and 18a are eliminated as pressure is applied to inflate annular sealing member 12 which drives annular inflatable seal 12 radially inward. FIG. 7 illustrates that although the edge of butterfly valve 11 is locked or slightly embedded in the deformable annular sealing member 12, there is relatively little actual alteration of the general shape of annular member 12. The integrity of the shape of annular member 12 that moves in and out to seal the valve greatly reduces the opportunity for particles to accumulate on the sealing member, yet one is able to form an effective seal through the resiliency of the annular legs, permitting the annular sealing member to tightly contact edge 11a.

The ridges 17 located on the side of annular sealing member 12 are normally in a compressed condition by an adjacent conduit to hold annular lips 55 and 56 in position in the mating recess in housing 13.

I claim:

1. A butterfly valve for opening and closing an opening in a conduit comprising:
   a housing having an inflatable sealing member located in said housing, said inflatable sealing member made from an elastomer material, said inflatable sealing member having elastomer legs that lengthen and contract in response to pressurization and a self-cleaning elastomer sealing portion of sufficient thickness that moves radially inward and outward as a unit in response to pressurization of said inflatable sealing member, said elastomer sealing portion locally deformable to form a seal around a rotatable butterfly disk, said inflatable sealing member including means to hold said inflatable sealing member in position on said housing to form an inflation chamber between said housing and said inflatable sealing member said inflatable sealing member having an interface portion forming an interface between a transport side of said inflatable sealing portion and the inflation chamber, and a rotatable butterfly disk mounted on a shaft extending through said inflatable sealing member, said butterfly disk having an exterior edge which, when in the closed condition and when the inflatable sealing member is in an uninflated condition, has a clearance therebetween with the improvement comprising:
   a rigid race having an exterior surface bonded to and carried by said interface portion of said inflatable sealing member and a sealing ring located in a cavity of said race so that when said shaft extends through said race, said race holds said sealing ring in a fluid sealing relation with said race and said shaft to provide a two-way fluid seal during relative movement between said shaft and said inflatable member.

2. The butterfly valve of claim 1 wherein said rigid race is metal.

3. The butterfly valve of claim 1 wherein said rigid race has an opening therethrough which is slightly larger than a diameter of the shaft to permit unhindered and unscored movement of said shaft with respect to said race.

4. The butterfly valve of claim 1 wherein said rigid race has a U-shaped cross section.

5. The butterfly valve of claim 1 wherein said rigid race has an exterior surface molded to said seal to prevent fluid from escaping therepast exterior of said race and to hold said inflatable seal as an integral unit proximate the region of said rigid race.

6. The butterfly valve of claim 1 wherein said rigid race is located coaxially with respect to an opening in said inflatable seal.

7. The butterfly valve of claim 1 wherein said rigid race has a first side, a second side and a third side, and said inflatable seal extends around and is bonded to all three of said sides.

8. The butterfly valve of claim 1 including a second rigid race and a second sealing ring located coaxially with respect to a second opening in said inflatable seal and a portion of said shaft.

* * * * *